Dec. 4, 1928.
C. E. BRADLEY ET AL
1,693,805
FASTENER COVERING METHOD AND MEANS
Filed June 12, 1925
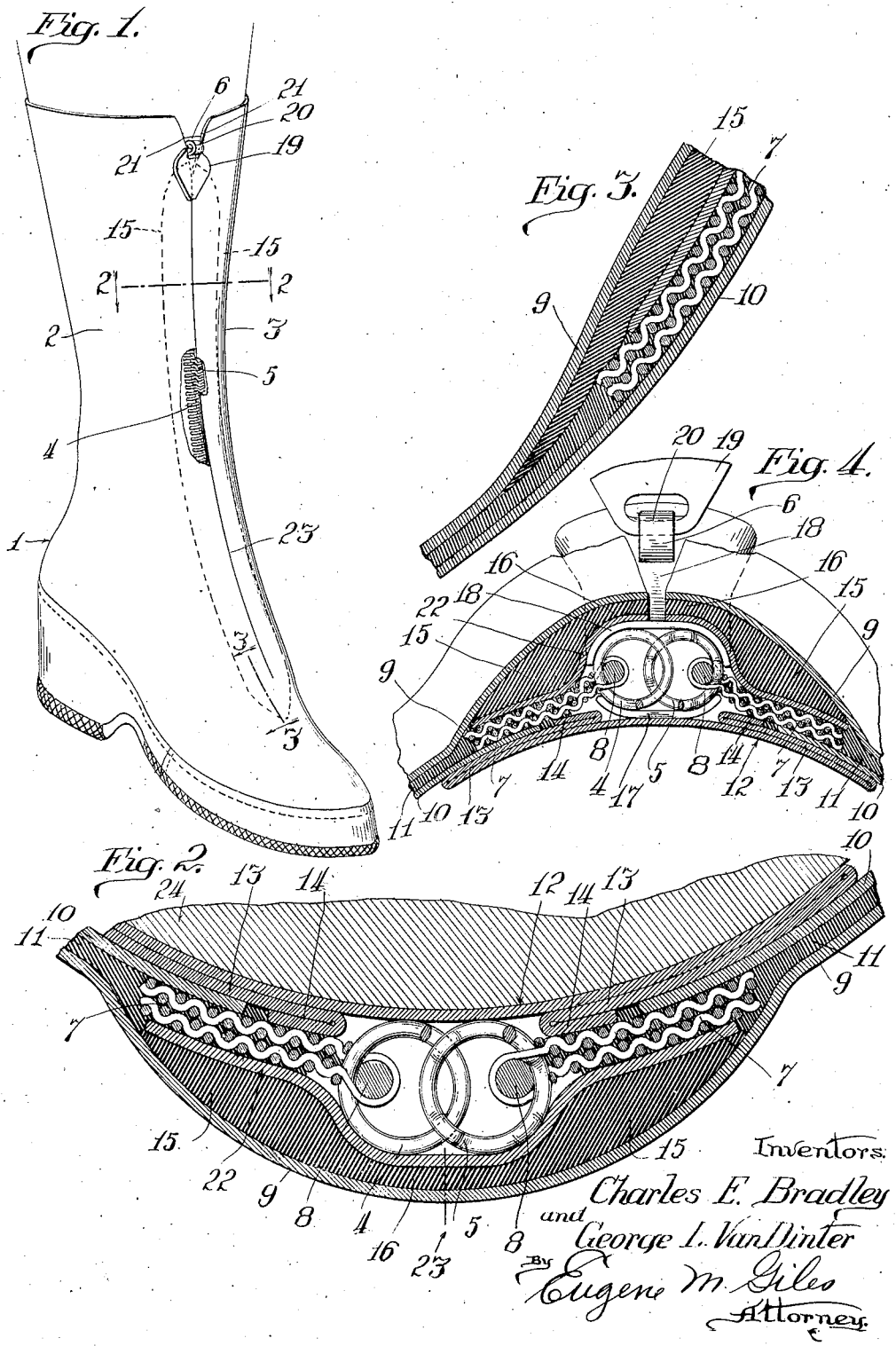

Patented Dec. 4, 1928.

1,693,805

UNITED STATES PATENT OFFICE.

CHARLES E. BRADLEY AND GEORGE L. VAN DINTER, OF MISHAWAKA, INDIANA, ASSIGNORS TO MISHAWAKA RUBBER AND WOOLEN MANUFACTURING COMPANY, OF MISHAWAKA, INDIANA, A CORPORATION OF INDIANA.

FASTENER-COVERING METHOD AND MEANS.

Application filed June 12, 1925. Serial No. 36,587.

Our invention relates to quick operating fasteners of the type wherein opposed series of fastener elements are arranged respectively on the parts which are to be connected, and adapted to be interlocked and released by the movement of a cam member or slider therealong, and our invention has reference more particularly to the method and means whereby the series of fastener elements are covered or concealed.

In articles employing fasteners of the type above mentioned it is oftentimes desirable to cover or conceal the fastener both for the purpose of improving the appearance of the article and also to protect the fastener against exposure to conditions which might injure the fastener or interfere with the satisfactory and free operation of same. It is necessary to have the line of division of the connected parts at the fastener and it has heretofore been the practice to attach the fastener elements to the edges of the parts to be connected, and thus when the fastener is closed, there is, between the parts, a gap which is occupied by the fastener and the latter is exposed. In some cases, as for example, in overshoes and footwear, mud, dirt or other particles sometimes collect on the fastener and interfere with the proper operation of same and it is desirable in many cases to conceal the fastener for the sake of improving the appearance of the article and also to protect the fastener against chafing, bumping and possible injury. This necessitates the extending of covering means from one or both the parts over the fastener, preferably in the form of a divided covering, the two parts of which meet edge to edge over the dividing line of the fastener. These edges should come together in closely adjoining relation and register quite accurately to form a smooth joint which will not be impaired by the operation of the cam member or slider along the fastener element, and particularly the finger grip which necessarily projects between the meeting edges. In practice it has been found impracticable to make a smooth, neat and satisfactory joint by fitting extended edges of the two connected parts together over the fastener. With our invention, however, we have devised a construction whereby extended edges may be conveniently formed to overlie the fastener element and which will register or come together at all times in proper relative position to afford a neat and satisfactory appearance, and which permit operation of the cam member or slider without affecting the desired fitting together of the two extension edges. Furthermore, our construction also readily lends itself to or permits a convenient reinforcing of the connected parts to prevent undue bending strains on the fastener and the surface covering of the article may be brought up to the juncture line of the extended edges so as to form substantially a smooth continuous surface which is interrupted merely by a dividing line which may be so made that it is almost unnoticeable.

The principal objects of our invention are to conceal a fastener of the quick operating type; to cover the outer face of a quick operating fastener so that it is not exposed to injury or subjected to conditions which might impair the proper operation of the fastener; to construct an article having a quick operating fastener so that the smooth finished surface of the article may be substantially continuous over the fastener; to provide an article having separable parts which are connected by a quick operating fastener with extension edges overlying the respective series of fastener elements on said parts; to insure a close approximation of the extension edges; to bring the extension edges together smoothly without irregularity which would prevent the proper and neat fitting together thereof; to provide a construction in which the finished surface material of the article may be extended over the fastener and merely separated by a substantially unnoticeable line of division; to provide a construction and a method whereby the covering of the fastener may be conveniently and readily accomplished in an inexpensive manner; to provide a reinforcing in connection with the fastener covering which prevents sharp bending and wrinkling; to arrange the reinforcing so that it serves to hold the meeting edges in proper position against deformation or displacement; to form the covering as a unitary structure which is subsequently divided along the line of the fastener; to insure the necessary resiliency which will permit flexing of the edges in the operation of the cam member or slider and insure return of the edges to the normal abutting relative position; to construct the fastener covering so that it does not interfere with the operation of the cam member or slider; and in general to provide a method and means whereby a quick operating fastener for connecting separable parts may be effectively covered in a neat and substantial manner.

On the drawings, Fig. 1 is a perspective view of an overshoe or arctic embodying our invention and having portions broken away to disclose details of the construction.

Fig. 2 is an enlarged sectional view on the line 2—2 of Fig. 1.

Fig. 3 is a fragmentary sectional view on the line 3—3 of Fig. 1; and

Fig. 4 is a detail view taken transversely through the fastener of Fig. 1 and showing the cam member or slider at the point at which the section is taken.

We have shown our invention herein as applied to an overshoe or arctic in order that the application of the invention may be readily understood but it is to be understood that the invention is not limited to such use but we propose to use the invention in connection with other footwear and also other articles wherein a quick operating fastener may be used.

Referring to the drawings,—the reference numeral 1 indicates as a whole an arctic or overshoe which is divided down the front to form separable side portions 2 and 3, and these have fastener members 4 and 5 respectively on the forward edges which are adapted to be interlocked and released by movement of a cam member or slider 6 therealong.

The fastener members 4 and 5 and the operating slider 6 may be of any suitable type and may be attached to the separable parts in any convenient manner. In the illustrated structure, however, I have shown a fastener of the coil spring type wherein the successive coils or convolutions of the spring 4 serve as fastener elements and are adapted to nest between the coils or convolutions of the spring 5. In practice the coils of the spring at one side are preferably formed with undulations or waves or some other irregularity whereby a more substantial interlocking takes place than if the coils of both spring elements were of the plain type. Moreover the coiled elements in the illustrated structure are secured to tapes 7 which are doubled over around a cord 8 passing lengthwise through the respective springs and the two sides of the tape are preferably secured together in any convenient manner to retain the cord 8 and spring in the folded edge and afford a two-ply stringer for attaching the fastener elements to the separable parts of the shoe or other article.

The overshoe upper is composed of an outer covering or facing 9 and the lining 10 having a layer of rubber composition 11 interposed therebetween, and a tape 7 is secured to the forward edge of the lining 10 as shown particularly in Fig. 2. It is a common practice to use a tongue of bellows type in the overshoe and this tongue which is indicated at 12 has lateral portions 13 folded inwardly over the front, and the inner edges of the portions 13 are folded outwardly as indicated at 14 and secured to the stringer or tape 7.

A filler of rubber indicated at 15 is laid over the outer face of the tape 7, being suitably formed in cross section to substantially fill the recess or corner between the tape 7 and the adjoining spring 4 or 5, and has a relatively thin edge 16 extending over the adjoining spring member 4 or 5 and terminating substantially at the dividing line between the elements 4 and 5. The outer face of the rubber strip 15 is formed so as to provide a smooth continuation of the surface of the overshoe and has the outer covering or facing 9 extending up to and terminating at the dividing line between the two rubber strips 15—15.

The slider 6 is of the usual type comprising inner and outer plates 17 and 18 respectively which are joined together and provided with inturned lateral edges forming divergent channels which serve in the downward movement of a slider to bend the spring members 4 and 5 outwardly thereby releasing the fastener elements and disconnecting the parts 2 and 3, while in the upward movement the slider draws the parts 2 and 3 together and through a corresponding bending movement of the spring elements 4 and 5 causes an intermeshing or interlocking of the coils thereof for connecting the side portions 2 and 3. This slider operates between the tongue 12 and the extension edges 16 of the side portions 2 and 3, being provided on its outer face with a finger grip 19 attached to the slider by a loop 20 or other convenient connecting means. In view of the divergent form of the slider 6 the elements 4 and 5 are spread apart somewhat at the upper end of the slider so that the adjoining edges of the extensions 16, which are normally substantially butted together, are separated sufficiently to afford clearance for the loop 20 so that the slider is free to operate without interference with the extension edges 16. At the upper extremity of the joint between the side portions 2 and 3 the edges 16 are preferably cut away as indicated at 21 so as to afford clearance for the loop 20.

The outer plate 18 of the slider 6 operates between the coiled elements 4 and 5 and the respective edge portions 16, which latter normally lie quite close against the spiral members 4 and 5 as indicated in Fig. 2 and in order to avoid undue friction between the edge portions 16 and the outer plate 18 of the slider, the rubber strips 15 are preferably provided with a lining 22 of fabric or other suitable material having a lesser degree of frictional resistance than the rubber itself, and which permits greater freedom of movement of the slider 6.

It has been found quite difficult to form extension edges on the side portions 2 and 3 which will properly come together when assembled in the shoe. We have found, however, that by making the extension edges 16 in a unitary structure, preferably integral with the widened out portions of the strips 15 and after completing the construction of the shoe, slitting the combined extension edge portion 16 along the line 23, the cut edges not only fit close together but maintain the abutting relation and form a smooth outer surface interrupted only by the dividing line 23.

In constructing the overshoe it is built up on the last 24 in the usual manner with the tongue 12 arranged in place, the fasteners 4 and 5 placed in the proper position in interlocked relations and with the tapes 7 overlying the forward extremities of the lining 10 and the out turned edges 14 of the tongue 12. A strip of fabric 22 is then laid over the interlocked fasteners 4 and 5 with the lateral portions extending outwardly at each side over the tapes 7 and this strip of fabric extends substantially from end to end of the fastener. A filler of rubber composition or other suitable material is then formed over the fabric strip 22 with a comparatively thin intermediate portion overlying the interlocked fasteners 4 and 5, and the side portions of this filler are thickened at opposite sides of the fasteners 4 and 5, as indicated in Figs. 2 and 4 so as to fill in the cavity or corner between the tapes 7 and the fasteners 4 and 5 and form a smooth outer surface merging with the upper of the overshoe. The rubber filler is preferably extended somewhat beyond the lower ends of the fasteners 4 and 5 and the tapes 7 to which these fasteners are attached somewhat as shown in Fig. 3 and tapered to a feather edge around the lower end so as to afford a smooth continuous surface at the lower end of the fastener. The facing or outer covering of the overshoe is then applied with a continuous portion extending over the rubber filler 15, it being the practice to shape same around and over the last and bring the edges together at the back of the overshoe. After the structure has been prepared in this manner, the assembled overshoe while on the last is vulcanized so as to cure the rubber and cause a consolidation of the rubber parts and to cause the fabric parts to firmly adhere to the rubber, and in the vulcanizing process the rubber filler 15 sets in the form which it is given over the last 24 so that when the last is removed the rubber tends to maintain the form in which it has been vulcanized.

After the overshoe structure has been properly vulcanized the portion of the rubber 15, lining 22 and facing 9 lying over interlocked fasteners 4 and 5 is slit or divided along the line 23 from the upper end of the overshoe to a point adjacent the lower extremities of the elements 4 and 5 and the slider 6 which may be applied before or after vulcanizing the shoe structure is then capable of movement along the elements 4 and 5 for interlocking and releasing same.

In view of the fact that the extension edges 16 have been formed as a unit over the interlocked fastener elements 4 and 5 they are given the proper form so that the edges line up properly and when the slit 23 is made these extension edges 16—16 not only fit close together so that there is no gap between but they assume the relative position forming substantially the smooth continuous outer surface interrupted only by an inconspicuous dividing line 23 thereby giving the overshoe, or other article constructed accordingly, an extremely neat and finished appearance and insuring thorough protection of the fastener elements 4 and 5 against damage or exposure to mud, dirt or other matter which might interfere with the operation of the fastener.

In certain articles in connection with which quick operating fasteners of this type are employed and particularly in articles of footwear the fastener is subjected to constant bending strains, and particularly in footwear such bending strains may be rather sharp and severe depending upon the construction and fit of the overshoe. With our construction the rubber strips 15 and the extension edges 16 serve to reinforce the edges of the side portions 2 and 3 so as to avoid wrinkling and sagging and prevent severe or abrupt bending of the fastener and these rubber strips 15 also by reason of the tapered form at the sides of the portions 16 serve to afford a substantial support for the edge portions 16 and maintain the meeting edges 16 in the proper relative position.

While we have shown and described our invention in a preferred form, we are aware that various changes and modifications may be made without departing from the principles of our invention the scope of which is to be determined by the appended claims.

We claim:

1. The combination with a pair of separable parts and a fastening device for connecting same, of a member consisting of elastic material slitted to form separable portions which operate simultaneously with the fastening of said device, so as to cover the latter.

2. The combination with separable parts, of a fastening device for connecting said parts, and matching edgewise abutting members of elastic material for automatically covering the fastening device as the device is fastened.

3. The combination with separable parts and a fastening device for connecting same, of extended portions of molded rubber composition on said parts adapted to be brought into adjoining relation by the operation of fastening said device and thereby cover the device when the latter is fastened.

4. The combination with separable parts and a fastening device for connecting same, of extended edge portions on said parts adapted to be brought together edgewise in the operation of fastening said device so as to cover the latter, said extended edge portions including a resilient reinforcing for yieldingly holding said edge portions in an adjoining edge to edge relation over the fastening device.

5. The combination with a pair of separable parts having cooperating fastening means on the edges for detachably connecting said parts, of portions of a divided rubber strip projecting from said parts over the fasteners and adapted to close together in the operation of connecting the parts and thereby cover the fastener.

6. The combination with a fastener comprising opposed series of fastener elements and a slider operable therealong for interlocking and releasing same, of means having separate resilient portions adapted to be positioned by the interlocking operation of the slider so as to cover the interlocked fastener elements.

7. The combination with a fastener comprising opposed series of fastener elements and a slider operable therealong for interlocking and releasing same, of means overlying the opposed series of fastener elements and adapted to be brought together by the interlocking movement of the slider so as to cover the interlocked fastener elements, said means being cut away at one end of the fastener adjacent the closed position of the slider.

8. The combination with a fastener comprising opposed series of fastener elements and a slider operable therealong for interlocking and releasing same, of elongated lips of fabric and rubber composition extending lengthwise of the respective series of fastener elements and adapted to be brought together by the interlocking movement of the slider so as to cover the interlocked series of fastener elements.

9. The combination with a fastener comprising opposed series of fastener elements and a slider movable therealong for interlocking and releasing same, of a laminated strip of flexible and resilient reinforcing material overlying each series of fastener elements and arranged so that the strips are brought together by the interlocking movement of the slider and form a covering for the interlocked fastener elements.

10. The combination with a fastener comprising opposed series of fastener elements and a slider movable therealong for interlocking and releasing same, of strips of flexible elastic material extending lengthwise over each series of fastener elements and adapted to be brought together edge to edge by the interlocking movement of the slider so as to cover the interlocked series of fastener elements.

11. The combination with a fastener comprising opposed series of fastener elements and a slider movable therealong for interlocking and releasing same, of an elongated mass of resilient material extending along each series of fastener elements and having a reduced edge portion extending over the respective series of fastener elements, said edge portions being adapted in the interlocking operation of the slider to close together over and cover the interlocked fastener elements.

12. The combination with a fastener comprising opposed series of fastener elements and a slider operable therealong for interlocking and releasing same, of flexible reinforcing means extending along each series of fastener elements and each having an extension edge, said extension edges being adapted to be closed together by the interlocking operating of the slider so as to cover the interlocked series of fastener elements.

13. The combination of a pair of separable parts each having a series of fastener elements on the edge thereof, a slider operable along the series of fastener elements for interlocking the fastener elements of one series with the fastener elements of the other series, and a reinforced resilient lip extension on each of the said parts adapted to be closed together by the interlocking movement of the slider so as to cover the interlocked fastener elements.

14. The combination of a pair of separable parts each having a series of fastener elements on the edge thereof, a slider operable along said series of fastener elements for interlocking the fastener elements of one series with the fastener elements of the other series, an elongated mass of resilient material on each part extending along side the series of fastener elements thereon and having an elongated lip extension projecting over the respective series of fastener elements, said lip extensions being adapted to be brought together edgewise by the interlocking movement of the slider so as to cover the interlocked series of fastener elements.

15. The combination with a pair of separable parts each having a series of fastener elements extending along the edges thereof and adapted to be interlocked and released by movement of a slider therealong, of a covering extending over the interlocked series of fastener elements and having the lateral edges secured respectively to the said parts and adapted to be divided between the said parts to permit release and separation thereof.

16. The combination with a pair of separable parts each having a series of fastener elements extending along the edges and adapted to be interlocked and released by movement of a slider therealong, a rubber covering having enlarged lateral portions secured respectively to the aforesaid parts and having a reduced intermediate portion overlying the interlocked fasteners, said covering being adapted to be divided along the line of separation of the series of fastener elements to afford separable cooperating lips meeting edge to edge when the fastener elements are interlocked.

17. The combination with a pair of separable parts each having a series of fastener elements along the edge adapted to be interlocked and released by movement of a slider therealong and wherein the fastener elements project outwardly beyond the outer surface of the respective parts, a filler of resilient material on the outer face of each part forming a gradual elevation from the surface of said part and terminating in a lip projecting over the series of fastener elements on said part, said lips being adapted to come together in edge to edge relation, when the fasteners are interlocked, and form a bridging from side to side over the interlocked fasteners.

18. The combination with a pair of separable parts each having the series of fastener elements on the edge thereof, a slider movable along said elements for interlocking and releasing same, and a facing on the outer surface of the said parts and extending over the interlocked fastener elements, said facing being divided along the line of separation of said fastener elements and forming a covering for the latter when interengaging.

19. The combination with a pair of separable parts each having a series of fastener elements on the edge adapted to be interlocked and released by movement of a slider therealong, a facing secured to the outer side of said parts and extending over the interlocked fastener elements, and a filler interposed between the facing and the said parts adjacent the series of fastener elements thereon and extending over the interlocked fastener elements so as to form a bridge gradually rising from the said parts and extending over the fastener elements, said facing and filler being divided along the line of separation of the fastener elements to form extension edges on the parts meeting edge to edge when the fastener elements are interlocked.

20. The combination with a fastener comprising opposed series of fastener elements and a slider operable therealong for interlocking and releasing same, of opposed lips overlying and meeting edge to edge over the interlocked fastener elements, and an antifriction facing on the under sides of said lips for facilitating the operation of the slider thereunder.

21. The combination with a pair of separable parts, of coiled fastener elements on the edges of the parts, a slider operable along the coiled fastener elements to interlock and release same, and a bridging mounted on said parts and extending over the fastener elements, said bridging being separable along the line of separation of the coil fastener elements.

22. In a shoe the combination of a pair of separable side portions each having a series of fastener elements on its forward edge adapted to interlock and release by movement of a slider therealong, and a covering over the fastener elements comprising extensions on the side portions, overlying the respective series of fastener elements and adapted to come together edgewise when the fastener elements are interlocked.

23. In a shoe the combination of a pair of separable side portions having series of fastener elements on the edges adapted to be interlocked and released by movement of a slider therealong, a bridging extending over the interlocked fastener elements and having lateral portions merging into the surface of the respective side portions, a facing extending over the bridging and around the overshoe and joined together at the back, said facing and bridging being divided along the line of separation of the fastener elements to afford separable portions which come together edge to edge when the fastener elements are interlocked.

24. The method of forming a covering for a fastener device whereby separable parts are detachably connected, which comprises securing the covering in place over the device while fastened, and then dividing the covering to permit separation of said parts.

25. The method of forming a covering for interlocking members which connect separable parts, which comprises bridging the interlocked members with an undivided covering, and subsequently dividing the covering along the line of separation of said parts.

26. The method of covering a quick operating fastener composed of series of fastener elements on separable parts which are interlocked and released by movement of a slider therealong, which comprises forming an integral bridging of rubber composition over the interlocked fasteners, and then dividing the bridging along the line of separation of the fasteners.

27. The method of covering a fastener of the class described, which comprises applying the interlocked fastener and the parts to be connected thereby on a form, with a mass of rubber composition bridging said parts so that the intermediate portion of said mass extends over the interlocked fastener, then vulcanizing the structure and after vulcanization dividing the mass of rubber composition along the line of separation of the fastener.

28. The method of constructing a shoe which comprises building up the shoe with a pair of separable parts having an interlocked quick operating fastener positioned between the separable parts, then applying a facing over the interlocked fastener and adjoining portions of said separable parts with a composition filler interposed between the facing and the separable parts and the interlocked fastener, then subjecting the structure on a form to vulcanizing action, and after vulcanization, dividing the filler and facing along the line of separation of the fastener elements.

CHARLES E. BRADLEY.
GEORGE L. VAN DINTER.